(12) United States Patent
Nakagawa et al.

(10) Patent No.: US 6,764,120 B2
(45) Date of Patent: Jul. 20, 2004

(54) MATERIAL HOLDING IMPLEMENT

(75) Inventors: Kenji Nakagawa, Toyohashi (JP); Hidenori Shirai, Kawasaki (JP)

(73) Assignee: Kao Corporation, Tokyo (JP)

( * ) Notice: Subject to any disclaimer, the term of this patent is extended or adjusted under 35 U.S.C. 154(b) by 290 days.

(21) Appl. No.: 09/883,997

(22) Filed: Jun. 20, 2001

(65) Prior Publication Data
US 2002/0195745 A1 Dec. 26, 2002

(51) Int. Cl.$^7$ .............................................. B32B 3/10
(52) U.S. Cl. ..................... 294/99.1; 294/902; 428/99; 269/287
(58) Field of Search ............................. 294/99.1, 902; 428/99; 269/287

(56) References Cited

U.S. PATENT DOCUMENTS 4,846,515 A * 7/1989 Hall, Sr. ................... 294/19.2

FOREIGN PATENT DOCUMENTS

| JP | 60-230844 | 11/1985 |
|----|-----------|---------|
| JP | 62-94543 | 5/1987 |
| JP | 62-46434 | 10/1987 |
| JP | 2-162011 | 6/1990 |
| JP | 2-206539 | 8/1990 |
| JP | 4-046638 | 2/1992 |
| JP | 4-154550 | 5/1992 |
| JP | 4-253690 | 9/1992 |
| JP | 4-279497 | 10/1992 |
| JP | 10-194388 | 7/1998 |
| JP | 10-194389 | 7/1998 |
| JP | 2000-168896 | 6/2000 |
| JP | 2000-326395 | 11/2000 |

* cited by examiner

Primary Examiner—Alexander S. Thomas
(74) Attorney, Agent, or Firm—Oblon, Spivak, McClelland, Maier & Neustadt, P.C.

(57) ABSTRACT

A material holding implement including a material holding member adapted for holding a material. The material holding member is made of a thermoplastic resin. The thermoplastic resin is deformable to a material holding configuration at a temperature greater than a constant temperature, and fixable to form a material holding region adapted to apply holding forces on a circumference of the material in a using temperature range lower than the constant temperature. Furthermore, a method of changing a form of the material holding member is provided. The method includes softening the resin by increasing a temperature above the constant temperature, molding the resin into a flat plate by pinching together upper and lower dies having flat surfaces opposing each other, pinching the resin using the upper and lower dies to form a material holding configuration, and fixing the resin by decreasing the temperature below a softening point of the resin.

5 Claims, 4 Drawing Sheets

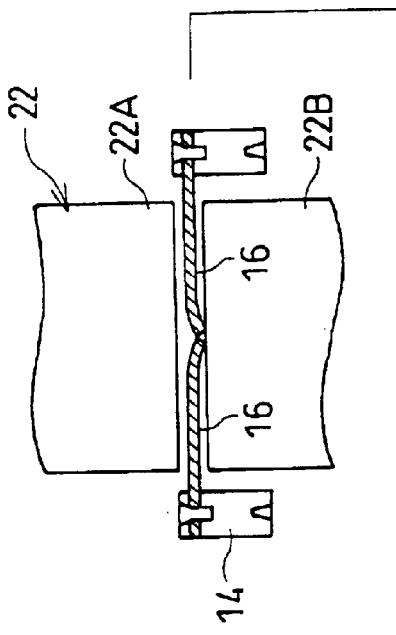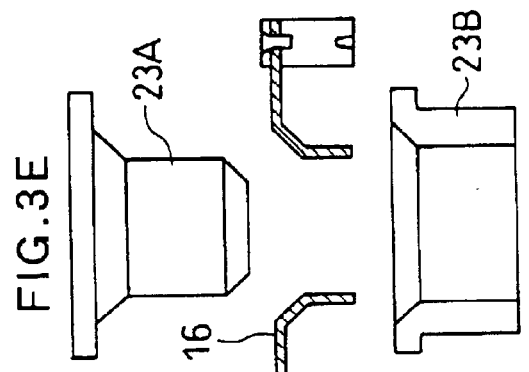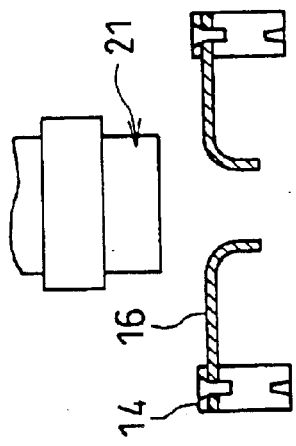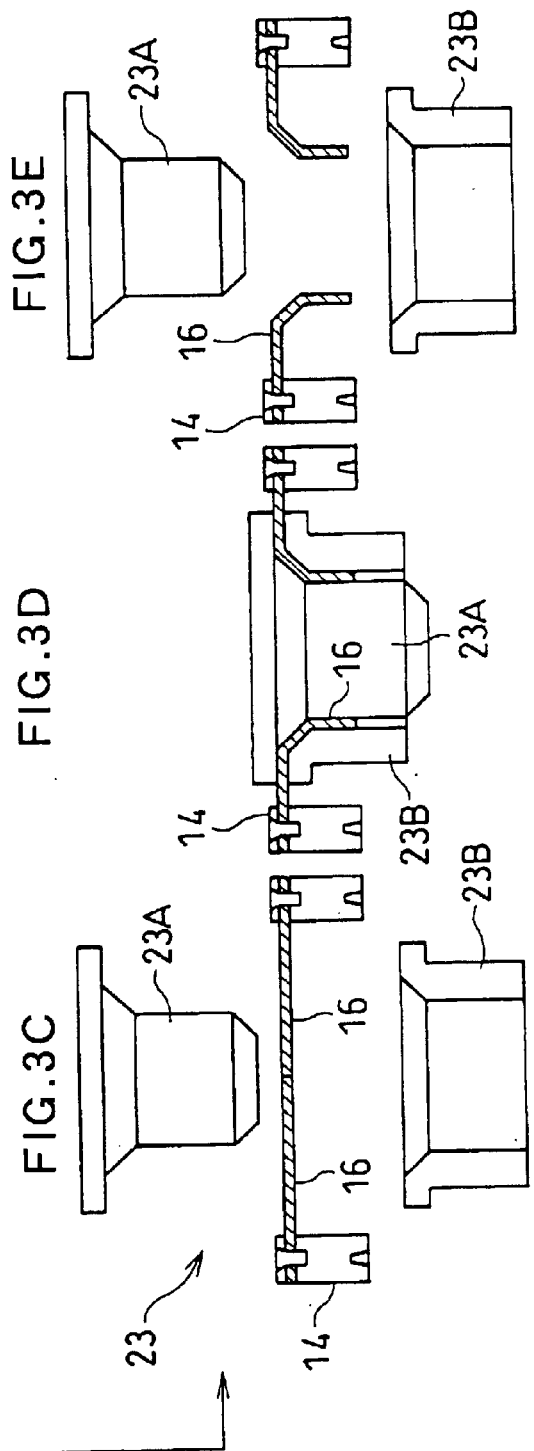

MATERIAL HOLDING IMPLEMENT

BACKGROUND OF THE INVENTION

1. Field of the Invention

The present invention relates to a material holding implement suitable for holding a material such as a container, such as in a container processing process accompanying a filling or capping process.

2. Description of the Related Art

Japanese Patent Application Laid-Open Publication (JP-A) No. 4-253690 describes a material holding implement having a material holding member made from a shape memory resin enabling a material to be held. The shape memory resin returns to an initial configuration at a temperature higher than a glass transition temperature (normally, a constant temperature about 20 to 60° C., and in the case of a material holding implement to be used at a normal temperature, the shape memory resin to be used is of a glass transition temperature about 50 to 60° C.) and is freely deformable into a desirable material holding configuration, and at a temperature lower than the glass transition temperature the material holding configuration is fixed to form a material holding region.

However, the related art has the following problems:

(1) when the material holding implement passes a certain high temperature range exceeding a glass transition temperature of shape memory resin at about 50 to 60° C., the shape memory resin constituting the material holding member immediately has an initial configuration restored, thereby losing the material holding configuration; and (2) when the material holding implement is used under a high humidity circumstance, the shape memory resin constituting the material holding member bulges due to moisture absorption and deforms, thereby losing the material holding configuration.

SUMMARY OF THE INVENTION

The present invention advantageously provides a material holding implement permitting a long-term stable use, without causing a material holding member to lose a material holding configuration, even in use in certain high-temperature range or under high-humidity circumstances.

The present invention is a material holding implement including material holding member adapted for holding a material, wherein the material holding member is made of a thermoplastic resin. The thermoplastic resin is deformable to a material holding configuration conformable to a desirable material configuration at a temperature higher than a certain temperature, and has a fixed material holding configuration in a using temperature range of lower temperatures than a certain temperature to form a material holding region for applying holding forces on a circumference of the material.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIGS. 3A to 3E are schematic diagrams showing a configuration providing procedure of the material holding member.

DETAILED DESCRIPTION OF THE PREFERRED EMBODIMENTS

Figure 1:
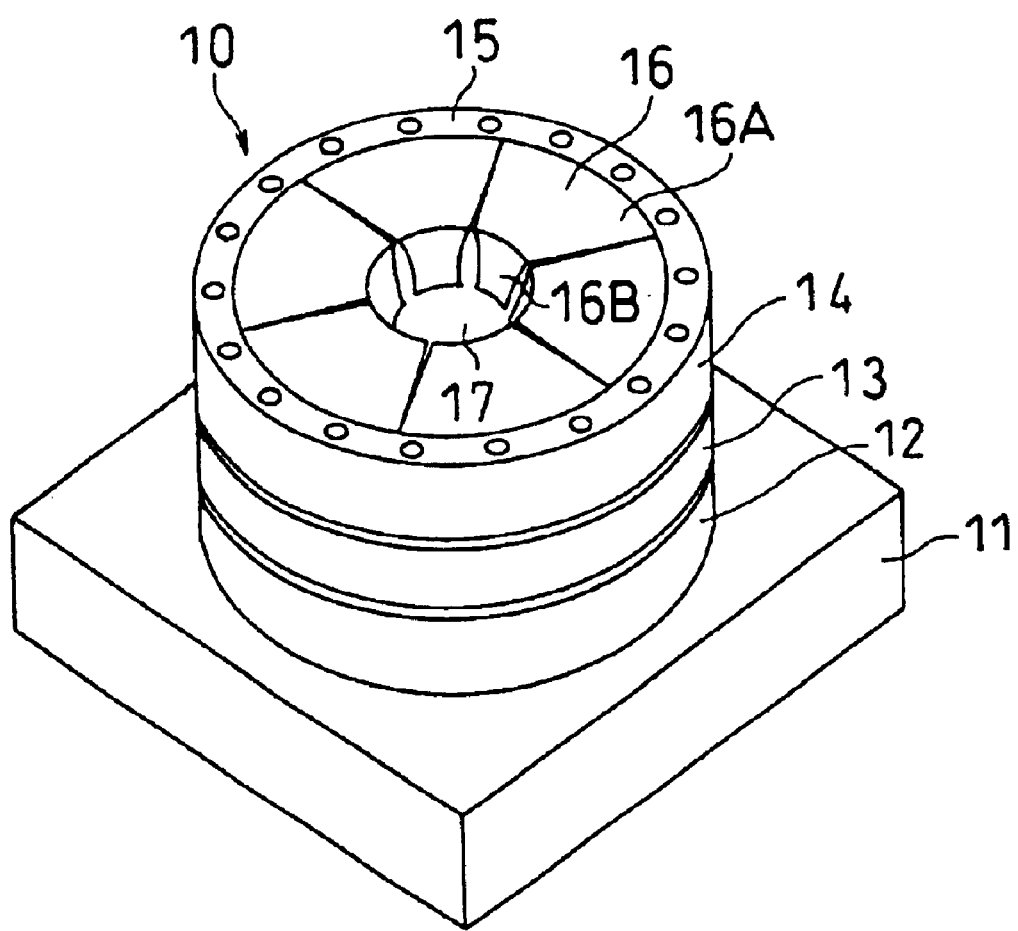
FIG. 1 is a perspective view showing a material holding implement.

A material holding implement 10 has, as shown in FIG. 1, a material holding member 14 connected via a height adjusting member 13 to first and second base members 11, 12 as base members, and is enabled by the material holding member 14 to hold a material (for example a container). The material holding implement 10 is adapted for conveying a material with a conveyor (not depicted), such as in a container processing line accompanying a filling or capping process, for example, to perform a positioning or the like of the material 1, such as to a filling operation position of a filling machine or a capping operation position of a capping device.

Figure 2B:
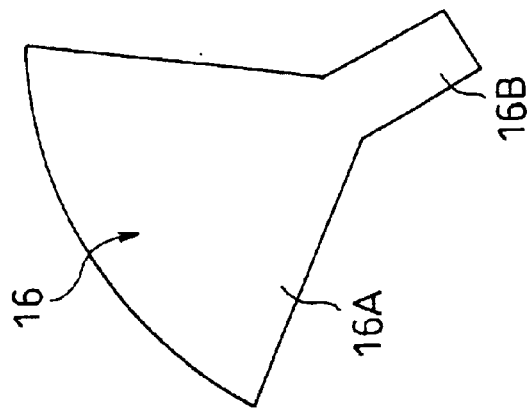
FIGS. 2A and 2B are schematic diagrams showing the material holding implement.

The material holding member 14 is provided with a plurality of thermoplastic resin plates 16 (six in this embodiment) annular in configuration to be fixed by a fixing ring 15. An alternative number of plates can be used, such as two at each of two sides of a material holding region, to be four in total, or six at each of the two sides, to be twelve in total. The material holding member 14 depicted in FIG. 2A includes the six thermoplastic resin plates 16, the respective thermoplastic resin plates 16 being arranged to be radially oriented about a center axis such that their distal end parts form a material holding region 17. Each thermoplastic resin plate 16 is formed by processing a flat plate made of a thermoplastic resin, such as a vinyl chloride resin, polyethylene resin, polypropylene resin, PET resin, or polystyrene resin. The thermoplastic resin plates 16 are configured with a fan shape part 16A at the side of a proximal end part to be fixed by the fixing ring 15 and a flat plate shape part 16B as the distal end part to face the material holding region 17, as depicted in FIG. 2B.

The thermoplastic resin plate 16, which is made from a thermoplastic resin as described, (a) softens at temperatures higher than a softening point of the thermoplastic resin, such that the resin is freely deformable into a material holding configuration conformable to a material model. And, it (b) has, within a using temperature range (for example normal temperature) lower in temperature than the softening point of the thermoplastic material, a fixed material holding configuration to form the material holding region 17 for applying holding forces on an outer circumference of a material.

Figure 4:
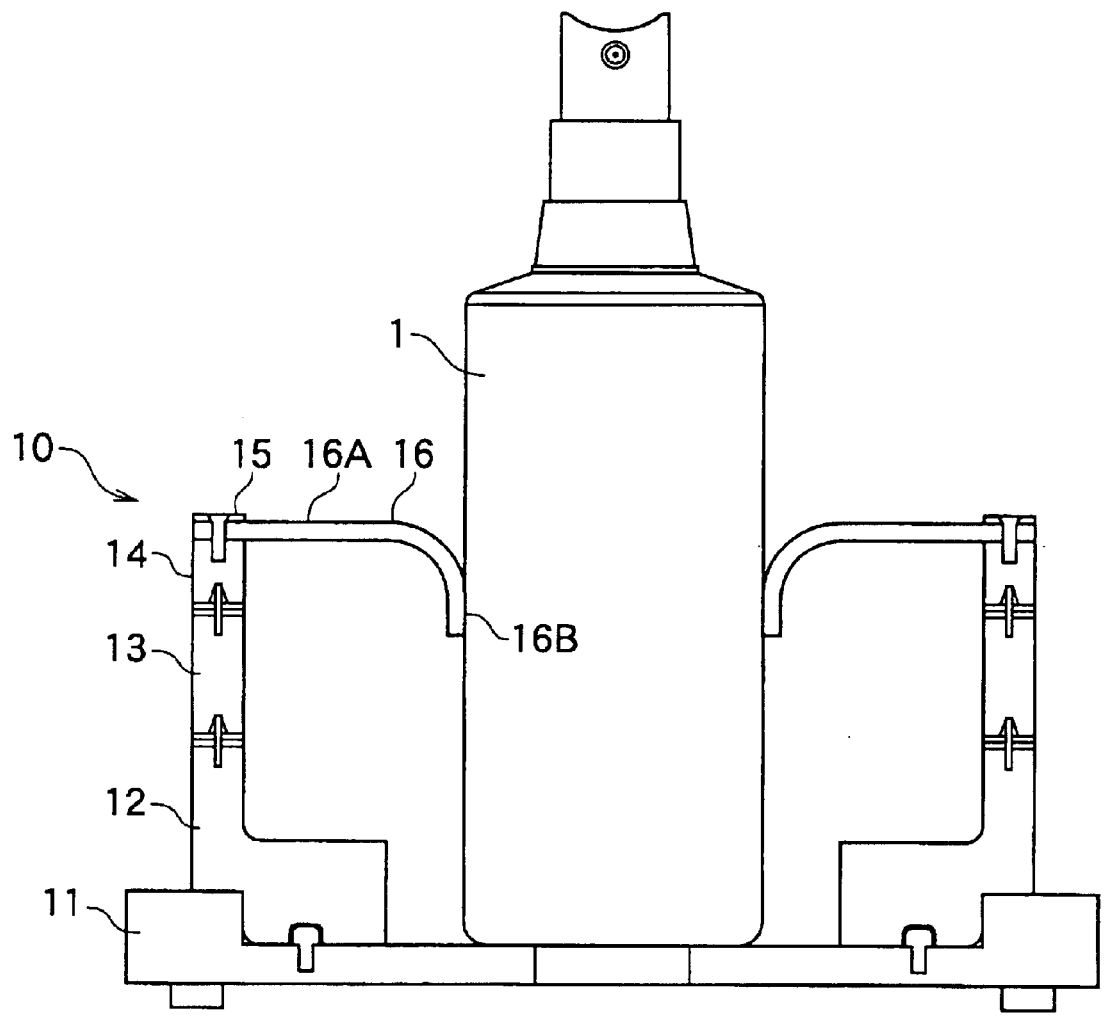
FIG. 4 is a side view showing a using condition of the material holding implement.

Therefore, in the material holding implement 10, assuming a material holding configuration to be given in accordance with the above-noted (a) and (b) by use of a material model (desirable in material configuration) with an identical configuration to the thermoplastic resin plates 16 of the material holding member 14 and the material or object 1 to be held, the thermoplastic resin plates 16 can have within the material holding region 17 a material holding configuration in which at least the flat plate rectangular parts 16B are deformed in a curved shape as shown in FIG. 1, for holding an outside of the material 1 in a stable manner as shown in FIG. 4, thereby allowing the material 1 to be centered.

Further, in the material holding member 14, because the six thermoplastic resin plates 16 are radially arranged about the material holding region 17, a whole circumference of the material can be held in a stable manner by respective ones of the six thermoplastic resin plates 16. It is noted that in the material holding member 14, when the material to be held has an elliptic form in cross section, a long axis of the elliptic form is made coincident with the direction of a centerline of a pair of thermoplastic resin plates 16, 16 positioned on an identical diameter in the material holding member 14, thereby allowing widthwise central parts of these thermoplastic resin plates 16 to hold the elliptic farm in a stable manner, at its sides in the long axis direction.

Further, in the material handling member 14, because at its thermoplastic resin plate 16 the distal end part is formed as the flat plate rectangular part 16B with a material holding configuration to face the material holding region 17, the flat plate rectangular part 16B of the thermoplastic resin plate 16 contacts on its flat plate shape surface the material, allowing the material to be held in a stable manner (FIG. 2B).

Figure 2A:
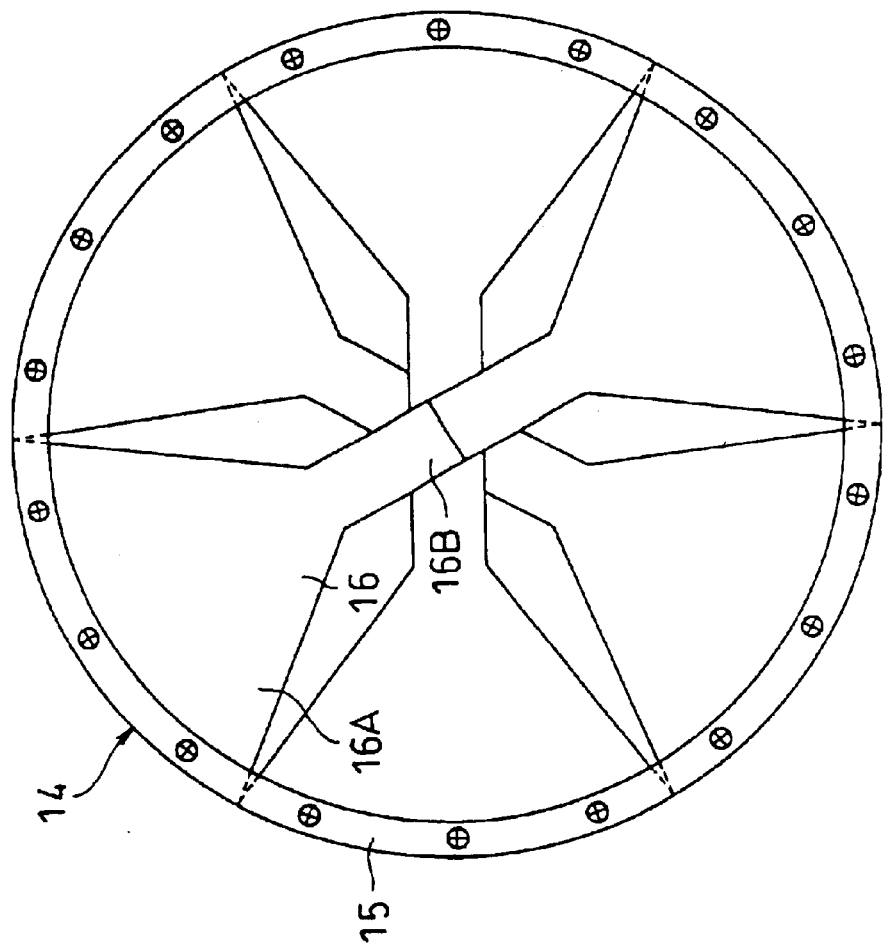

Further, in the material holding member 14, in an initial configuration of the thermoplastic resin plates shown in FIGS. 2A and 2B, the flat plate rectangular parts 16B of all the thermoplastic resin plates 16 have their central parts overlapping each other. Thereby, even when the size of the material to be held is extremely small in diameter, the thermoplastic resin plates 16 is allowed to have a material holding configuration with the flat plate rectangular parts 16B necessarily deformed in a curved form about the material holding region 17, permitting an ensured formation of the material holding region 17 for the material extremely small in diameter.

FIGS. 3A to 3E depict form changing method of the material holding implement 10 according to the present invention.

The material holding implement 10 is formed as shown in FIGS. 3A to 3E, by using a heating device 21, a flat plate forming device 22, and a configuration providing device 23. The material holding member 14 is removed from the first and second base members 11, 12, and the thermoplastic resin plates 16 of the material holding member 14 are softened by increasing the temperature from a certain temperature (softening point), using hot air, infrared rays or such of the heating device 21 (FIG. 3A).

The thermoplastic resin plates 16 of the material holding member 14 thus softened are pinched to be molded flat by upper and lower dies 22A, 22B of the flat plate forming device 22 (FIG. 3B).

The thermoplastic resin plates 16 of the material holding member 14 which are now in a softened state, are pinched by upper and lower dies 23A, 23B of the configuration providing device 23, to provide a material holding configuration (FIGS. 3C to 3E). The material holding configuration of the thermoplastic resin plates 16 provided by the configuration providing device 23 is fixed by decreasing the temperature below the softening point, for example, by supplying cooling air.

A height adjusting member 13 is then joined to the first and second base members 11, 12; as necessary. The material holding member 14 is then set to the first and second base members 11, 12 and the height adjusting member 13.

The upper and lower dies 23A, 23B of the configuration providing device 23 may preferably be used in a state having a softening point higher at least by 10° C. than the softening point of the resin of the thermoplastic resin plates 16. Although the upper and lower dies 23A, 23B of the configuration providing device 23 may be metallic, due to the large number of sets of upper and lower dies 23A, 23B that will be manufactured, upper and lower dies 23A, 23B made of resin are preferable due to the ease of manufacturing such resin dies.

The upper and lower dies 23A, 23B may be made of an MC nylon or Duracon, and the thermoplastic resin plates 16 may be made of a polyethylene resin or vinyl chloride resin as a thermoplastic resin having a relatively low softening point. As a practical example of the form changing method, in an example using thermoplastic resin plates 16 that are 3 mm thick and made of a high-density polyethylene (HDPE) (softening point 70 to 85° C.), the thermoplastic resin plates 16 may be kept for one minute in an air circulation type oven of 150° C., and molded into flat plates by the upper and lower dies 22A, 22B of the flat plate forming device 22. Thereafter, the thermoplastic resin plates 16 may be configured with a material holding configuration using the upper and lower dies 23A, 23B made of MC nylon, before performing a cooling process. Thereby, a desirable material holding configuration is obtainable. Although various cooling methods can be used, in the case of a water cooling process performed at a water temperature of 20° C., the desirable material holding configuration can be secured within a period of 30 seconds. Even in the case of an air cooling at a room temperature of 25° C., the desirable material holding configuration can be secured within 5 minutes.

Therefore, the present embodiment has several advantageous features as will be discussed below.

Thermoplastic resins such as a vinyl chloride resin and a polyethylene resin have high softening points (about 70 to 100° C. in the case of vinyl chloride resin and about 70 to 85° C. in the case of polyethylene resin), and even when softened, will not deform to restore their initial configurations like a shape memory resin. Therefore, when thermoplastic resin plates 16 are employed as a material holding member 14 of a material holding implement 10 to be provided with a material holding configuration, even if the material holding implement 10 is passed to a certain high-temperature range about 50 to 60° C., for example, so long as the temperature range is within a low temperature range in comparison with a softening point of the thermoplastic resin or the passing time is a constant time, the material holding member 14 including the thermoplastic resin plates 16 will not lose its material holding configuration.

The softening point described in this specification represents the lowest temperature at which a thermoplastic resin is deformable by an outside force. The temperatures recited as "higher than a certain temperature", and "lower than a certain temperature" can be the softening point. However, more appropriately, when the thermoplastic resin is deformed to a material holding configuration conformable to a desirable material configuration at higher temperatures than a "certain temperature", the "certain temperature" is desirably within a range from the softening point of the thermoplastic resin to $(Tm+20)°$ C. (where Tm is a melting point of a thermoplastic resin). Moreover, with respect to deforming a thermoplastic resin to a desirable configuration in a shorter time, the "certain temperature" is more desirably within a range from $(Tm-20)$ to $(Tm-5)°$ C. $(Tm+t)°$ C. shows the temperature that is $t°$ C. higher than the melting point. $(Tm-t)°$ C. shows the temperature that is $t°$ C. lower than the melting point. For example, Tm of a vinyl chloride resin is 150° C., and its "certain temperature" is preferably 70 to 170° C., and more preferably 130 to 145° C. Tm of a polyethylene resin is 125° C., and its "certain temperature" is preferably 70 to 145° C., and more preferably 105 to 120° C. On the other hand, when the thermoplastic resin is fixed in a material holding configuration in a using temperature range lower than a "certain temperature", the "certain temperature" is preferably 0 to 60° C., and more preferably 0 to 40° C.

The thermoplastic resin does not deform by bulging even with absorbed moisture. Therefore, when the thermoplastic resin plates 16 employed as a material holding member 14 of the material holding implement 10 is configured with a material holding configuration, even in use under a high-humidity circumstance, the material holding member 14 including the thermoplastic resin plates 16 maintain the material holding configuration.

Because the material holding region 17 is adapted for applying holding forces on a circumference of a material such that the material is centered, it is unnecessary to use another device for centering the material, such as during a filling operation of a filling machine or a capping operation of a capping device.

Because a plurality of thermoplastic resin plates 16 constituting the material handling member 14 are radially arranged about the material holding region, a whole circumference of the material can be held in a stable manner by respective ones of the plurality of thermoplastic resin plates 16.

Because distal end parts of the thermoplastic resin plates 16 facing the material holding region 17 have flat plate forms, the thermoplastic resin plates 16 contact the material using flat plate shape surfaces (not points nor lines), thereby allowing for a stable holding of the material.

A form changing of the material holding member 14 in the material holding implement 10 is performed by having a step of softening a thermoplastic resin plate 16 constituting the material holding member 14 by increasing the temperature from a constant temperature, a step of molding the softened thermoplastic resin plate 16 into a flat plate by pinching using upper and lower dies 22A, 22B having flat surfaces opposing each other, a step of pinching the thermoplastic resin plate 16 as molded flat yet in a softened state, by upper and lower dies 23A, 23B configured in a material configuration, to provide a material holding configuration, and a step of fixing the thermoplastic resin plate 16 provided with the material holding configuration by decreasing the temperature below a softening point of the thermoplastic resin, whereby a form changing operation can be fast achieved in an ensured manner.

The upper and lower dies 23A, 23B of the configuration providing device 23 are manufactured by using a resin, whereby the manufacture is facilitated even in manufacture of multiple upper and lower dies 23A, 23B corresponding to multiple kinds of materials. In addition, the upper and lower dies 23A, 23B are manufactured by using a resin having a softening point higher by at least 10° C. than the softening point of the thermoplastic resin plate 16 of the material holding member 14, whereby deformations of the upper and lower dies 23A, 23B can be prevented, even when providing the thermoplastic resin plate 16 with a material holding configuration by pinching the thermoplastic resin plate 16 of the material holding member 14 as molded flat yet in a softened state, using the upper and lower dies 23A, 23B.

As described, according to the present invention, there can be achieved a material holding implement permitting a long-term stable use, without causing a material holding member to lose a material holding configuration, even in use in a certain high-temperature range or under high-humidity circumstances.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A material holding implement comprising:

a material holding member adapted for holding a material, said material holding member being made of a thermoplastic resin, wherein said thermoplastic resin is deformable to a material holding configuration conformable to a desirable material configuration at a temperature higher than a certain temperature, and fixable in said material holding configuration to form a material holding region adapted to apply holding forces on a circumference of the material in a using temperature range lower than the certain temperature, wherein said material holding member comprises a plurality of thermoplastic resin plates, each of said thermoplastic resin plates being radially arranged about said material holding region.

2. The material holding implement according to claim 1, wherein each of said thermoplastic resin plates has a distal end part facing said material holding region, and wherein each distal end part has a flat plate form.

3. A material holding implement comprising:

a base; and a plurality of plates arranged about a perimeter of a material holding region, said plurality of plates having a first end mounted to said base and a distal end facing said material holding region, wherein said plurality of plates are made of a thermoplastic resin, and wherein said thermoplastic resin is deformable to a material holding configuration at a temperature greater than a predetermined temperature, and fixable to the material holding configuration at a temperature below the predetermined temperature.

4. The material holding implement according to claim 3, wherein each of said plurality of plates are radially arranged about said material holding region.

5. The material holding implement according to claim 4, wherein each distal end part has a flat plate form.

* * * * *